United States Patent
Vilke et al.

(10) Patent No.: US 8,774,043 B2
(45) Date of Patent: Jul. 8, 2014

(54) METHODS AND APPARATUS FOR USING A LAYERED GEAR TO ANALYZE AND MANAGE REAL-TIME NETWORK QUALITY OF SERVICE TRANSMISSION FOR MOBILE DEVICES ON PUBLIC NETWORKS

(75) Inventors: Stephen D Vilke, Danville, CA (US); Rudy Willis, Clayton, CA (US); James Selvidge, Berkeley, CA (US); Paul Hinks, Larkspur, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 203 days.

(21) Appl. No.: 13/492,804

(22) Filed: Jun. 9, 2012

(65) Prior Publication Data
US 2012/0314599 A1 Dec. 13, 2012

Related U.S. Application Data

(63) Continuation of application No. PCT/US2012/041776, filed on Jun. 8, 2012.

(60) Provisional application No. 61/494,863, filed on Jun. 8, 2011.

(51) Int. Cl.
*H04J 1/16* (2006.01)

(52) U.S. Cl.
USPC .......................................................... 370/252

(58) Field of Classification Search
USPC ......... 370/252, 253, 254, 312, 328, 329, 332, 370/338, 349, 389, 392, 395.1, 401, 450, 370/469, 470, 471, 516, 477; 709/206
See application file for complete search history.

(56) References Cited

U.S. PATENT DOCUMENTS

| | | | |
|---|---|---|---|
| 6,091,709 A | 7/2000 | Harrison et al. | |
| 7,200,576 B2 | 4/2007 | Steeves et al. | |
| 7,701,884 B2 | 4/2010 | Chapweske et al. | |
| 7,747,086 B1 | 6/2010 | Hobbs et al. | |
| 7,912,001 B2 | 3/2011 | Wright | |
| 8,446,835 B2 * | 5/2013 | Baucke et al. | 370/252 |
| 8,619,596 B2 * | 12/2013 | Wiley et al. | 370/248 |
| 2003/0144034 A1 | 7/2003 | Hack et al. | |
| 2007/0206615 A1 | 9/2007 | Plamondon et al. | |

(Continued)

OTHER PUBLICATIONS

International Search Report (PCT/US2012/041776) dated Sep. 13, 2012—(2 pages).
International Search Report (PCT/US12/41772) dated Aug. 10, 2012—(2 pages).
International Search Report (PCT/US 2012/022618)dated Jun. 1, 2012 (2 pages).

(Continued)

*Primary Examiner* — Chi Pham
*Assistant Examiner* — Alexander O Boakye
(74) *Attorney, Agent, or Firm* — Martine Penilla Group, LLP

(57) ABSTRACT

Methods and apparatus for providing layered gear mechanism to analyze network loss and latency conditions includes bundling data into data packets of varying depths, at a source with data packets of each depth belonging to a particular data type. The data packets of varying depths are transmitted in layers over a network, to a destination. Information for the transmitted data packets for each layer is collected constantly and analyzed as the data progresses along the network to identify corresponding network transmission characteristics. The transmission of subsequent data packets for anyone of the layers is adjusted based on the network transmission characteristics. The adjusting is repeated one or more times based on the analyzed information for the transmitted data packets. The transition metrics for each layer is utilized for relative analysis of transmission metrics across the layers to set the adjusting.

25 Claims, 7 Drawing Sheets

(56) References Cited

U.S. PATENT DOCUMENTS

2008/0209223 A1  8/2008  Nandy et al.
2010/0020823 A1  1/2010  Bai et al.
2010/0260048 A1  10/2010  Dolganow et al.
2010/0268762 A1  10/2010  Pahlavan et al.
2010/0309794 A1  12/2010  Keynan et al.

OTHER PUBLICATIONS

Lang et al. "Impeding CAPTCHA Breakers with Visual Decryption" [online] Proc.8$^{th}$ Australasian Information Security Conference. (AISC 2010). [retrieved on May 19, 2012 [May 9, 2012] Retrieved from the internet <URL: http://crpit.com/confpapers/CRPITV105Lang.pdf>.

* cited by examiner

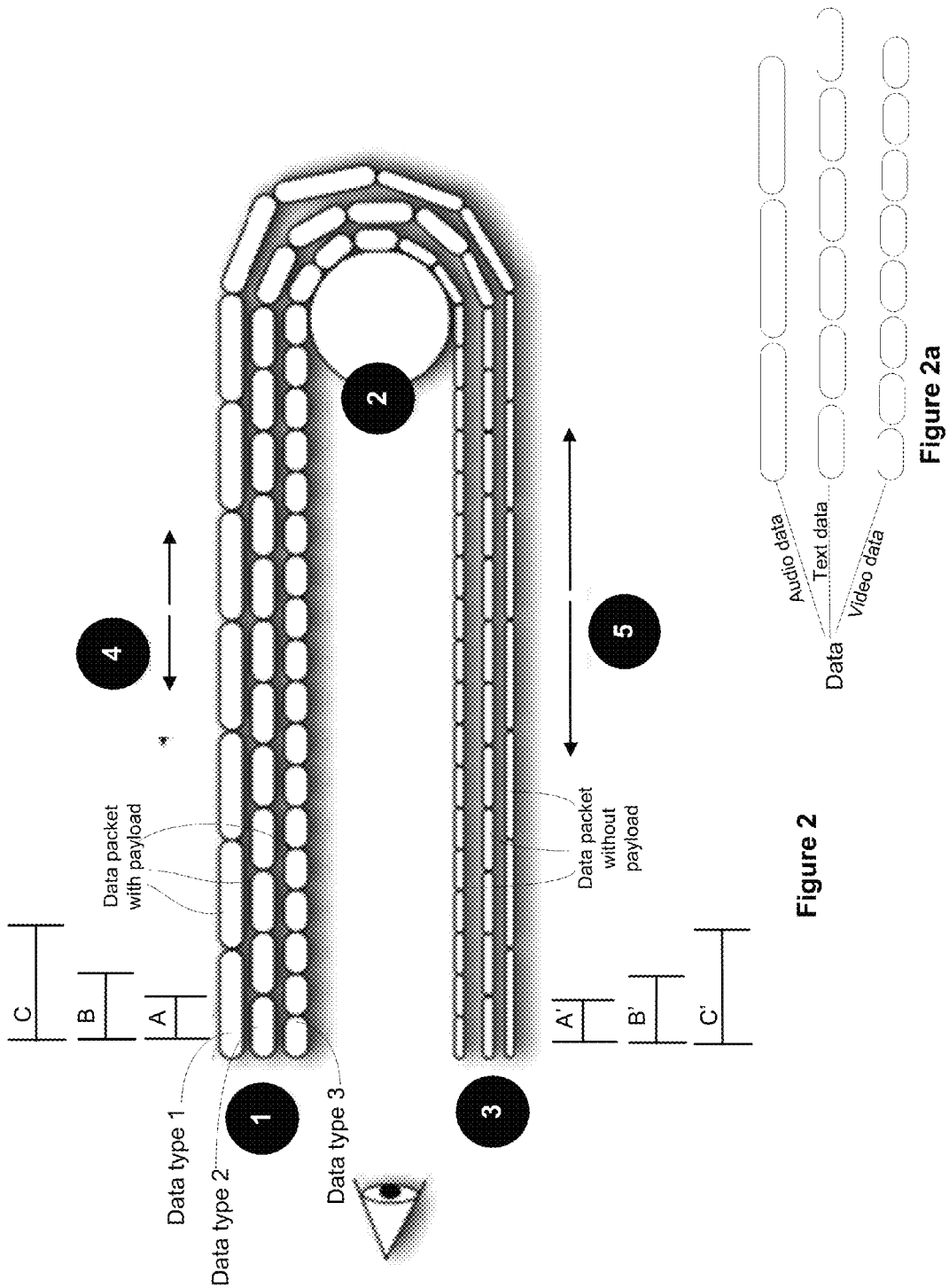

| Time | Layer 1 of Data Type 1 | Layer 2 of Data Type 2 | Layer 3 of Data Type 3 |
|---|---|---|---|
| $t_0$ | ... | ... | ... |
| $t_1$ | $TM_{L1-1-1}$<br>$TM_{L1-1-2}$<br>$TM_{L1-1-3}$<br>$TM_{L1-1-n}$ | $TM_{L2-1-1}$<br>$TM_{L2-1-2}$<br>$TM_{L2-1-3}$<br>$TM_{L2-1-n}$ | $TM_{L3-1-1}$<br>$TM_{L3-1-2}$<br>$TM_{L3-1-3}$<br>$TM_{L3-1-n}$ |
| $t_2$ | ... | ... | ... |
| $t_3$ | ... | ... | ... |
| ... | ... | ... | ... |
| $t_n$ | ... | ... | ... |

TM for Layer

Figure 3

| Time 0 - 5 | Data type 1 at depth 1 | Data type 2 at depth 2 | Data type 3 at depth 3 |
| --- | --- | --- | --- |
| Time 6 - 10 | Data type 1 at depth 2 | Data type 2 at depth 3 | Data type 3 at depth 1 |
| Time 11 - 15 | Data type 1 at depth 2 | Data type 2 at depth 1 | Data type 3 of depth 3 |
| Time 16 - 20 | Data type 1 of depth 3 | Data type 2 of depth 1 | Data type 3 of depth 2 |
| Time 21-25 | Data type 1 of depth 3 | Data type 2 of depth 2 | Data type 3 of depth 1 |
| Time 26 - 30 | Data type 1 at depth 1 | Data type 2 at depth 3 | Data type 3 at depth 2 |

Figure 4

METHODS AND APPARATUS FOR USING A LAYERED GEAR TO ANALYZE AND MANAGE REAL-TIME NETWORK QUALITY OF SERVICE TRANSMISSION FOR MOBILE DEVICES ON PUBLIC NETWORKS

CLAIM OF PRIORITY

This application claims priority under 35 U.S.C. §§120 and 365(c) as a continuation application of prior International Application PCT/US 12/41776, which was filed on Jun. 8, 2012, and which claimed priority to U.S. Provisional Patent Application No. 61/494,863, filed on Jun. 8, 2011, and entitled "A Method for Using a Layered Analog Gear to Analyze and Manage Real-Time Network Quality of UDP Service Transmission for Mobile Devices on Public Networks," which is incorporated herein by reference in its entirety.

RELATED APPLICATION

This application is related to commonly owned U.S. patent application Ser. No. 12/784,454, filed May 20, 2010, entitled, "Methods for Interfacing with a Virtualized Computing Service over a Network using a Lightweight Client," and U.S. patent application Ser. No. 12/784,468, filed on May 20, 2010, entitled "Systems and Algorithm for Interfacing with a Virtualized Computing Service over a Network using a Lightweight Client," which are incorporated herein by reference in their entirety.

BACKGROUND

1. Field of the Invention

The present invention relates to data communication over a network and more specifically to an gear mechanism to statistically analyze UDP network loss and latency conditions.

2. Description of the Related Art

Communicating across the public Internet has becoming challenging due to variable nature of composite links. Cellular networks exacerbate the issue with loss due to physical transmission characteristics and congestion from the manifestation of large number of handheld computing devices, such as smartphones and tablets.

Traditional communication relied heavily on Transmission Control Protocol over Internet Protocol (TCP over IP) for guaranteed transmission. In the TCP protocol, every packet transmitted is accounted for and tracked through completion. Since applications have become sensitive to delay and timeouts, TCP/IP has been a difficult network layer to rely on. This is due to the fact that any loss and delay conditions encountered during data transmission causes excessive delays in the effective transaction rate due to wait times of retransmission and reordering of packets prior to usability.

Further, at greater distances, the problems with TCP timing windows become exaggerated. Most applications at large distances suffer from poor user experiences, mostly related to click response. The reason for this is that the ability to react to lost or delayed packets is limited to the knowledge that those packets are lost or delayed. For the packets that are lost or delayed, the reliance on round trip communication to establish the state of the transmission can be compounded by multiple trips.

An alternative protocol, such as User Datagram Protocol (UDP), was preferred for its speed and low overhead in reliable networks due to lack of verification. However, the UDP protocol became less desirable as networks became unreliable and hubs became the primary force of networking gear wherein all ports saw the same broadcast traffic. Although UDP has low overhead, it is difficult to use the protocol on public Internet and cellular networks as random, stochastic loss and congestion create delays, jitter, out-of-order packets and loss.

While there are many applications that require absolute transaction fidelity, there are many other applications where timing and completeness are not high priority. Both discreet and continuous data sets, such as picture transmission, video, audio, etc., can have this relaxed requirement.

There is, therefore, a need for a design that leverages the benefits of the UDP design for the speed and combines it with a good Quality of Service (QoS) management of transmission that leverages some statistical modeling to establish a faster-than-roundtrip response.

It is in this context, embodiments of the invention arise.

SUMMARY OF THE INVENTION

The embodiments of the invention include methods and apparatus for providing a layered gear mechanism to analyze network loss and latency conditions, without having to wait and account for every transmitted packet. The gear mechanism generates a statistical model that identifies system state of loss, latency and network stats, so that appropriate steps can be taken to make adjustments to the network transmission, in substantial real time, so as to improve the likelihood of better performance. The statistical model is built by leveraging differential analysis of data at multiple depths of the same gear and building assumptions around a normal behaving system. The differential analysis is combined with actual measurement of packet round trip completion so as to optimize the data transmission over the network. The cadence and deltas of each layer's timing is measured in real-time and combined with analysis across the various layers with relative differentials of the system to provide a deep understanding of the system behavior. Such analysis provides a real-time map of the state of the system as a whole and provides statistically relevant data faster than any individual packet's round trip traversal of the system.

The mechanism also takes into consideration a level of data abstraction for some data included in the transmission and provides the ability to ignore retransmission of such data if such ignorance provides an advantage in reducing congestion and loss contribution. The mechanism not only provides the ability to effectively measure the data at a receiving end of the gear, but also identifies issues, such as slack, on the source side of the data stream, which enables detection of transmission problems, such as delay due to congestion, data loss, latency, etc., faster than the completion of the round trip. It has been shown that with the current gear mechanism, the transmission time can be reduced to at least one half of the round trip time, if not better.

Several distinct embodiments are presented herein as examples.

In one embodiment, a processor-implemented method for providing layered gear mechanism to analyze network loss and latency conditions is disclosed. The method includes bundling data into data packets of varying depths, at a source. The data packets of each depth belong to a particular type of data. The data packets of varying depths are transmitted in layers over a network, to a destination. Each layer of transmitted data packets is associated with a particular depth. Information for the transmitted data packets for each layer is collected as the data progresses along the network. The collected information is analyzed for the data packets of each layer to identify network transmission characteristics of each layer. The network transmission characteristics identify transmission metrics for each layer. The transmission of subsequent data packets for anyone of the layers is adjusted based on the network transmission characteristics. The adjusting is repeated one or more times based on the analyzed information for the transmitted data packets. The transition metrics for each layer is utilized for relative analysis of transmission metrics across the layers to set the adjusting.

In another embodiment, a non-transitory computer readable medium having program instructions that can be executed by a processor of a computing system, is disclosed. The computer readable medium includes program instructions for bundling data into data packets of varying depths, at a source. The data packets of each depth belong to a particular type. The computer readable medium also includes program instructions to transmit the data packets of varying depths in layers over a network, to a destination. Each layer of data packets corresponds to each depth. The computer readable medium further includes program instructions for collecting information for the transmitted data packets for each layer as the data packets progress along the network and analyzing the collected information for the data packets of each layer to identify network transmission characteristics of each layer. The network transmission characteristics identify any transmission metrics for each layer. The computer readable medium includes program instructions for adjusting the transmission of subsequent data packets for anyone of the layers based on the network transmission characteristics. The program instructions for adjusting includes program logic to adjust the transmission one or more times based on the analyzed information for the transmitted data packets. The transmission metrics for each layer utilized for relative analysis of transmission metrics across the layers to set the adjusting.

The invention will be readily understood by the following detailed description taken in conjunction with the accompanying drawings and claims.

BRIEF DESCRIPTION OF THE DRAWINGS

The present invention will be readily understood by the following detailed description in conjunction with the accompanying drawings.

FIG. 2 illustrates an implementation of the gear mechanism for data transmission and for analyzing the network loss and latency conditions, in one embodiment of the invention.

FIG. 2a illustrates different types of data that are identified for transmission over the network, in one embodiment of the invention.

FIG. 3 illustrates a representation of transmission metrics collected for different data types over time, based on the analysis of transmitted data packets, in one embodiment of the invention.

FIG. 4 illustrates different data packaging recipes that are available within the compliance rules for packaging the data of different types, in one embodiment of the invention.

DETAILED DESCRIPTION

Several exemplary embodiments for providing layered gear mechanism to analyze network loss and latency conditions, particularly using protocols, such as UDP protocol, will now be described. It will be apparent to those skilled in the art that the present invention may be practiced without some or all of the specific details set forth herein. Although the embodiments are extensively described with reference to particular protocol, the teachings of the invention can be extended to other protocols that suffer similar disadvantages.

Figure 1:
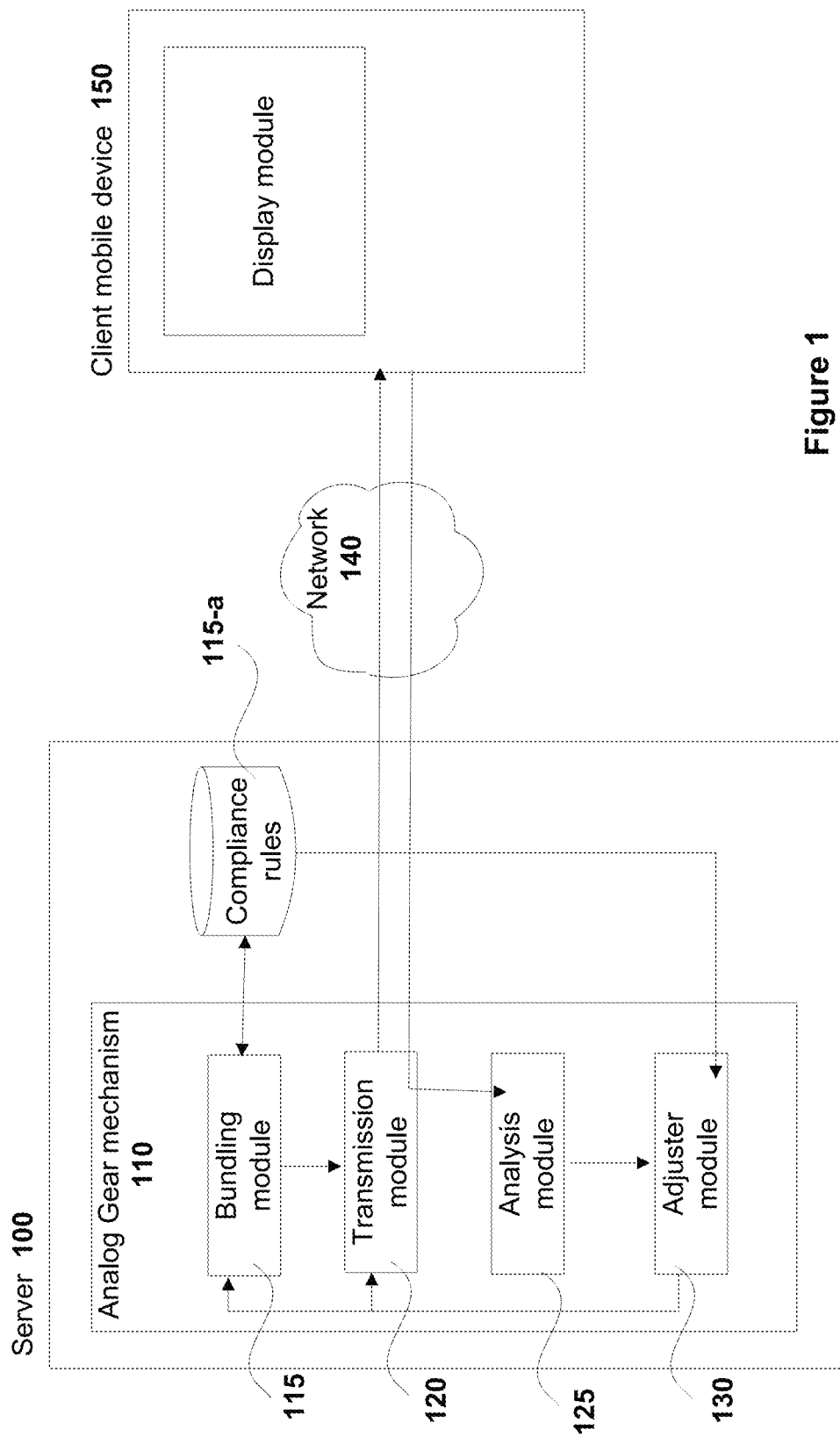
FIG. 1 illustrates a simplified block diagram of a system identifying various modules and the interaction between the various modules within the system used for providing layered gear mechanism to analyze network loss and latency conditions, in one embodiment of the invention.

The present invention defines methods and systems for providing layered gear mechanism to analyze network loss and latency conditions and to compensate for the loss and latency, in substantial real time. FIG. 1 illustrates a simplified block diagram of a system that provides layered gear, in one embodiment of the invention. The system includes a gear mechanism 110 provided on a server 100. The gear mechanism 110 can be embodied as a hardware component, a software module or a combination of hardware component and software modules. For purposes of discussing the digital process of communication between source and destination, reference is made to an analog gear. It should be understood that digital processing carried out by hardware and/or software is not a mechanical gear or an analog gear. Rather, it is used to describe digital processing that mimics or resembles processing by software and hardware, with corresponding functionality that would likely occur in a physical gear mechanism. The gear mechanism 110 includes a plurality of modules, each having distinct functions for providing layered gear used to transmit data from a source to a destination 150 in layers over the network 140 and to analyze information received back from the destination 150. The source, in one embodiment, is the server 100 on which the gear mechanism 110 is disposed and the destination 150 is any one of a mobile device, including but not limited to smartphones, cellular devices, tablets, etc. The functional modules within the gear mechanism 110 include a bundling module 115, a transmission module 120, an analysis module 125 and an adjuster module 130. The functional modules interact with one another and with the destination device to provide layered gear and to analyze network loss and latency conditions experienced during transmission of data using the layered gear.

Figure 1A:
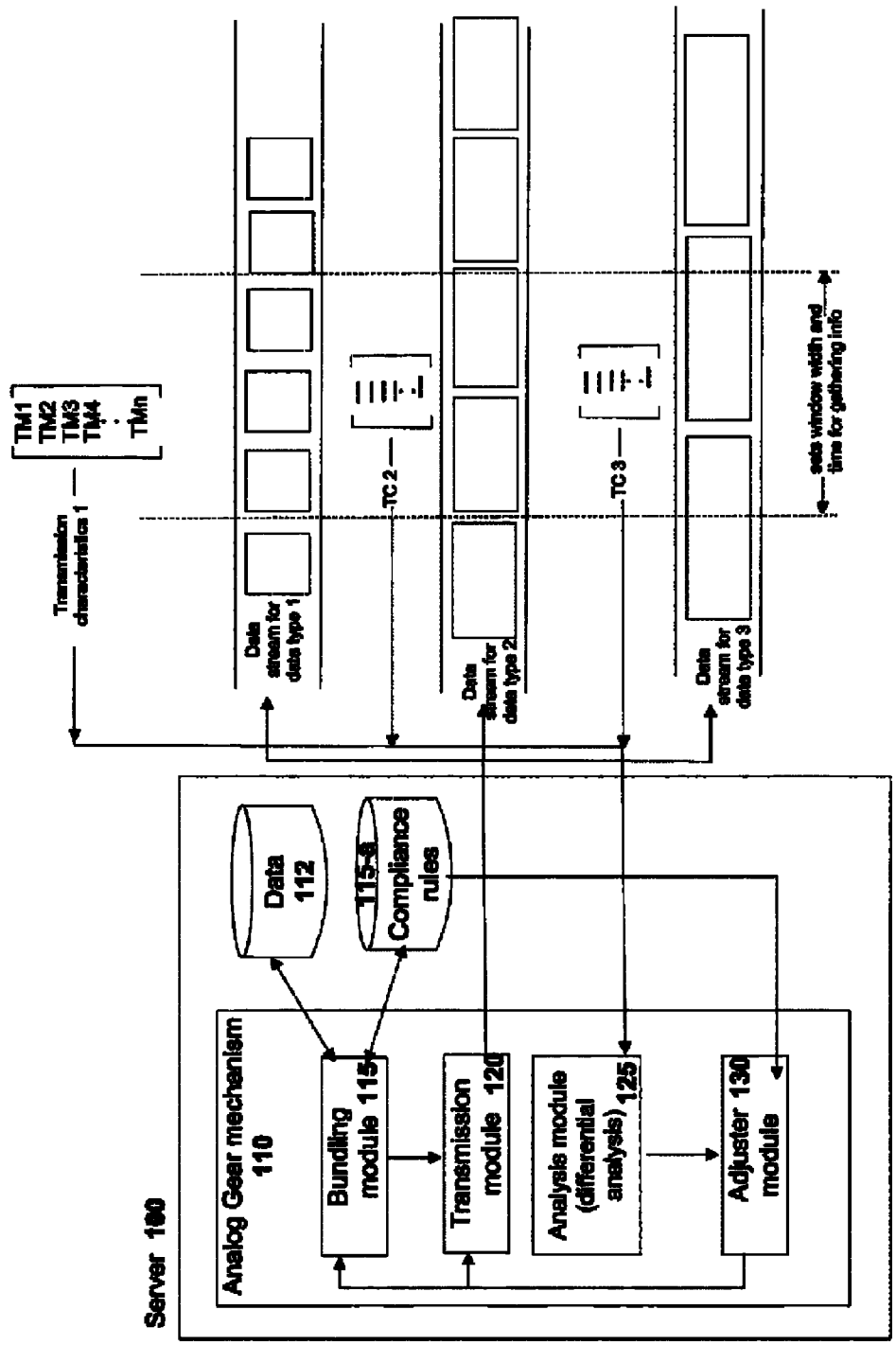
FIG. 1a illustrates a logical representation of the system of FIG. 1 that identifies the modules that are used during the transmission of data packets over the network.

Referring now to FIG. 1a, the bundling module 115 is configured to package data in varying depths for transmission over the network 140. In one embodiment, the network 140 is a cellular network over which the mobile devices, such as smartphones, mobile phones, etc., exchange data. In one embodiment, the bundling module 115 interacts with data stored in a database 112 to identify the data to be transmitted and with a rules database 115-a to identify one or more compliance rules that need to be followed during bundling of data into data packets so as to enable the data packets to be transmitted over the network. For instance, the rules may include protocol and network related compliance rules, such as maximum streaming tolerance for the network used in the transmission. Other rules may include type of data allowed, depth of data (also termed the width or amount of data within a payload, i.e. either large/small) in each packet for each data type, format of packet (i.e. format of header), to name a few. In one embodiment, different types of data may be assigned different depths. In one embodiment, the depths may be predefined for each type of data and the corresponding rules will provide this information to the bundling module. The above referenced rules are exemplary and should not be considered exhaustive. As a result, additional rules may be defined for bundling different types of data.

The bundling module 115 within the gear mechanism identifies the different types of data that are scheduled for transmission and retrieves the corresponding rules from the rules module. The bundling module 115 uses the rules to package the different types of data to generate data packets of varying depths such that each type of data is packaged at specific depth. It should be noted that the depth of the packet relates to the width or amount of data within a payload portion f the data packet. Depending on the protocol used for communication over the network, the data packets may include payload data and housekeeping data. The housekeeping data may include header data that can specify the source and destination of the data, etc. Additionally, the housekeeping data may include cyclic redundancy code (CRC), etc. The amount of data within the payload can vary within the limit specified for the particular protocol used for communication. In one embodiment, the data packets in different layers are packaged at varying depths with data within the payload portion in each layer being at a particular depth or width that is a fractional combination of a pre-defined minimal width. The data packets bundled according to the rules are transferred to the transmitting module 120 for transmission over the network using the network protocol.

The transmission module 120 receives the data packets and layers the data packets of varying depths such that data packets of each depth placed in specific layers, as illustrated in FIG. 1a. The transmission module places the layered data packets on the network in network stacks in a consistent way. The data packets are transmitted to the destination device 150 according to the network communication protocol and the destination device places responses in response data packets back onto the network in the same consistent way at the same depth and layer as it was received. For instance, if the depth of each data packet (i.e. width) received at the destination is A, then the returning data packets from the destination for the corresponding data packet is also of width A. It should be noted, however, that the content of the data packets sent from the source (i.e. server) to the destination (i.e. mobile device) are different from the content of the data packets returned in the response from the destination back to the source. The data packets sent from the source to the destination include the payload data and the housekeeping data, wherein the housekeeping data provides information about the payload data, including the type of data, source information, destination information, etc., and the data packets returned in the response from the destination back to the source may include only housekeeping data. Additionally, the response from the destination includes returning data packets that are sent at the same cadence by which they are received from the source. In one embodiment, the gear mechanism may select a small window of data packets to track through the network and provide the transmission information.

The returning data packets and other information related to the network transmission are collected at the transmission module 120 and forwarded to the analysis module 125, in substantial real time, for further analysis to determine network transmission characteristics. In one embodiment, collection of information entails collecting data related to network transmission characteristics that determines the network behavior toward the data packets in each layer as the data packets in each layer progress along the network. This does not require collection of actual data packets as the data packets are travelling the network. In another embodiment, collection of information may entail collection of one or more data packets for further examination and analysis. In one embodiment, the collection of information is done constantly in real-time and the collected information is analyzed and proactively adjusted in substantial real-time before any potential problems can flare-up on the network that can cause data loss/latency. In alternate embodiments, the collection of information, analysis and adjusting is done periodically, sporadically, on-the-fly, etc. The frequency of collecting information related to the data packets, analyzing and adjusting is driven by the need for providing a smooth data flow and for maximizing the network resource.

In addition to the cadence information, the transmission module also tracks the count of data packets sent from the source and received back in the response from the destination. The analysis module 125 collects all the information, in substantial real time, for each layer including the input cadence and output cadence associated with the data packets sent from and received at the source, input count/output count, etc., for each data type sent in each layer. In The analysis module 125 analyzes the collected information of each layer to determine network transmission characteristics at each layer. The network transmission characteristics identify transmission metrics (TM1, TM2, TM3, etc.) of each layer, such as the deltas of the various data types that identifies "slacks" and "tension"/"stress", as the data stream travels over the network, as illustrated in FIG. 1a. The transmission metrics highlight network conditions, such as congestion, that affect communication in the system. The analysis module 125 observes the various data types and the corresponding deltas for each layer and across the different layers to identify the network transmission characteristics in each layer, such as standing wave propagation patterns, loss characteristics of consistency, loss characteristics of spike tolerance, loss and latency characteristics of oscillation patterns, statistical likelihood of various size loss holes, ebb and flow patterns of loss/latency, etc. The above list of network transmission characteristics are exemplary and should not be considered exhaustive. Other characteristics may be identified based on the analysis and observation. These environmental characteristics may be combined to illuminate some interesting physical system characteristics that define transmission metrics, such as stochastic loss pattern, deterministic loss pattern, statistical likelihood of loss per packet size/data type, patterns of congestion, correlational stimulus/response to certain types /size of network behavior, etc.

By observing the data and the deltas of corresponding data types in each transmission layer and across the different transmission layer, maximum throughput can be established using deterministic loss as an upper bound. As data is sent through the system, the deterministic boundary can be constantly evaluated by various layers of the transmission chain without overtly threatening the overall transmission chain. The maximum throughput can be achieved based on the constant evaluation.

The results from the analysis module 125 are forwarded to the adjuster module 130 within the gear mechanism to adjust transmission of subsequent data packets for anyone of the layers so as to achieve maximum throughput. In one embodiment, based on the analysis, the adjuster module 130 may interact with the transmission module to adjust the transmission of subsequent data packets. The adjuster module 130 views the various data transmission patterns in each layer defined by the transmission metrics within the network transmission characteristics and make decisions in a number of areas that control the overall quality of the transmission in each layer. For instance, the adjuster module 130 can choose to transmit some data packets of a particular layer proactively based on the analysis by adjusting transmission of subsequent data packets in the particular layer to include additional data packets of the particular layer, so that the subsequent data packets transmitted over the network can improve the quality of transmission over the network. Alternately, the adjuster module 130 can choose to transmit some of the data packets in a reactive manner to adjust the network transmission characteristics based on the response received from the destination that indicates these data packets were indeed lost in transmission.

Additionally, the adjuster module adjusts the size and amount of data packets to be transmitted as well as the format of the data packets to be transmitted, based on the collected data and the network transmission characteristics. Based on the need to transmit additional data packets, the additional data packets can be identified and bundled for transmission in a manner that increases the likelihood of successful transmission to the destination. The analysis module may interact with the transmission module and the bundling module to identify the additional data packets and package the additional data packets in a manner that complies with the compliance rules for the particular layer and is consistent with the transmission protocol of the network.

The adjuster module may analyze the transition metrics collected at different times to determine the transmission pattern that can generate the optimized result at the destination. FIG. 3 illustrates the transition metrics network transmission characteristics obtained from the analysis module over time from the periodic analysis of the data packets as the data packets progresses over the network. Based on the periodic analysis, the gear mechanism may identify the transmission pattern that provided the transmission metric, highlighted in the elliptical box in time, $t_i$ of FIG. 3, resulting in the optimal transmission effect.

The gear mechanism may also use the adjuster module to determine optimal depth for each data type provided in each layer. The bundling module may be used to package the data having different data types at different depths based on the compliance rules. The compliance rules may provide different recipes for each data type and the bundling module may use test each of the recipes over different time to determine which recipe provides the optimal result at the destination. FIG. 4 illustrates the different recipes defining various combinations of depth for different types of data that is available in the compliance rules. During the initial set up for transmission or periodically during the transmission, the bundling module may use the various recipes to package each data type in each layer to generate data packets. The data packets are placed in the respective layers by the transmission module and the network response is monitored periodically as the data packets progress through the network. Information collected from the monitoring is fed to the analysis module which determines the optimal recipe for packaging the data of different data types in corresponding data packets. The adjuster module makes adjustments to the data packets based on the analytics provided by the analysis module.

Figure 5:
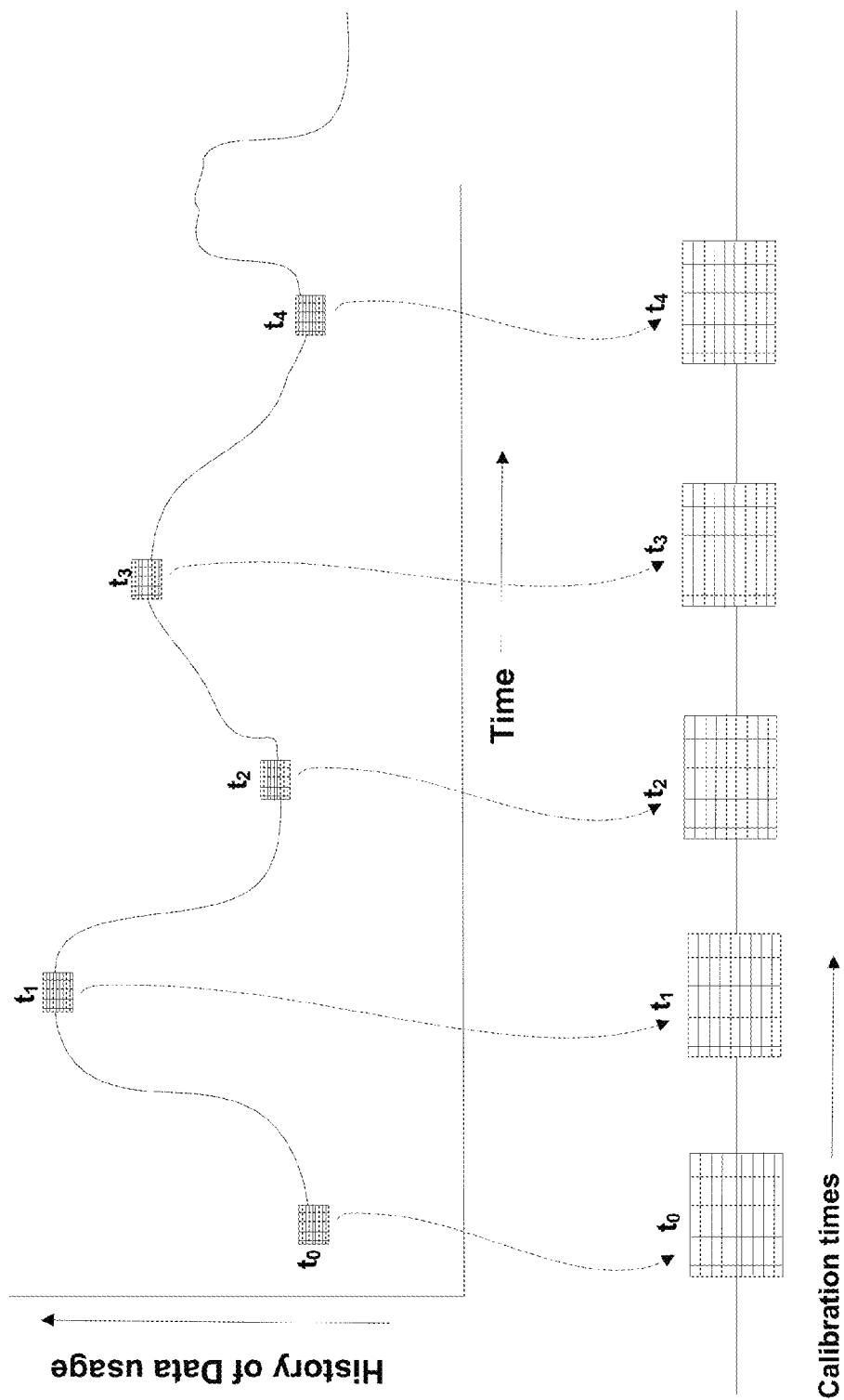
FIG. 5 illustrates a graphical representation of data usage history over time and the calibration performed by the adjuster and/or bundling module of the gear mechanism, in one embodiment of the invention.

FIG. 5 illustrates a graphical representation of the various times the adjuster module performs the adjustment to the data packets for transmission over the network to obtain optimal result at the destination. The top graph of FIG. 5 captures the data usage history over time. Based on the data usage, the analysis module may determine the network transmission characteristics that identifies the different transmission metrics of each data type transmitted from the source in each layer. The adjuster module may adjust the transmission of data packets periodically based on the transmission metrics so as to fully utilize the network bandwidth without the likelihood of data loss. As shown in FIG. 5, based on the data usage at times $t_0$, $t_1$, $t_2$, $t_3$, etc., the adjuster module may adjust the bundling and transmission of data packets based on the transmission metrics to optimize the result that uses the network resource efficiently to achieve the right QoS effect.

Additional adjustments can also be made to accommodate the additional system characteristics exhibited by many network systems, wherein the network systems allow short burst of transmission over and above the established streaming tolerances. Based on the need to transmit and the network system characteristics, attempts can be made to ignore the bursts or handle the likelihood of deterministic loss with some proactive techniques, such as smoothing the bytestream, redundant transmission or any other techniques that is not discussed herein.

Thus, the cadence and deltas of each layer's timing system collected at different times combined with the analysis of cadence and deltas across the layers having relative differentials can provide a mesh of system behavior that provides a real-time map of the state of the network system as a whole and provides statistically relevant data of network state faster at the destination than any individual packet's round trip traversal of the network system. The cadence and deltas of each layer and across the different layers are collected and analyzed in a continuous manner during the course of data transmission over the network, the real-time map of the state of the network system continually updated so as to allow real time adjustment to the data transmission to enable network transmission optimization.

FIG. 2 illustrates an implementation of the gear mechanism described above for data transmission and for analyzing the network loss and latency conditions, in one embodiment of the invention. The process of data transmission and analysis begins at the source, such as server 2.1, where data for transmission to a destination device, is identified. The data may be of varying types, such as news article, RSS feed, video feed, audio feed, image, etc., and more than one type of data may be identified for transmission, in response to a click at the destination device. FIG. 2a illustrates the different types of data that can be identified within the data selected for communicating to the destination. In one embodiment illustrated in FIG. 2a, the data includes data types, such as video, audio, and text. The data types illustrated in FIG. 2a is illustrative and should not be considered restrictive. Additional data types can be identified so long as the data types are capable of being bundled according to compliance rules and transmitted over the network. Each data type is packaged into respective data packets of specific depth. In one embodiment illustrated in FIG. 2, data belonging to a first data type is packaged at a depth 'A', data of a second data type at a depth 'B' and data of a third data type at a depth 'C'. The different data types are bundled/packaged by the gearing system in a consistent manner using fractional linear combination of particular width. The number and depth of the various data types illustrated in FIG. 2 is exemplary and should not be considered restrictive. Additional data types may be included at different depths depending on the data identified for transmission. For instance, if the identified data for transmission includes textual data, video data, and audio data, the textual data may be packaged at a depth 'A', video data at depth 'B' and audio data at depth 'C' with the depth of B and C being fractional combination of width A such that depth of A<B<C, as illustrated in FIG. 2. The depths may be pre-defined for each of the different data types according to compliance rules of the network and stored in a database, such as a rules database at the server. The gear mechanism, at the server, refers to the rules in the rules database when bundling the different types of data for transmission. The gear mechanism recognizes the need to transmit different signals for different functions and distinctly bundles the different signals, representing different types of data, into corresponding set of data packets at different depths using same technique. Thus it is safe to say that each distinct set of data packets at a particular depth belongs to a particular data type. Once the data is distinctly bundled into corresponding set of data packets, the gear mechanism transmits the data packets at corresponding depths in a consistent way by assigning the data packets of each depth to a specific layer as network stack.

In another embodiment, one or more data types may be packaged at the same specific depth while other data types are packaged at different depths. Using the above example of textual data, video data and audio data, the textual and audio data are packaged at a depth of 'A' and video data packaged at a depth of 'B'. In this embodiment, the gear mechanism may package the two different types of data at the same depth but transmit the different data types in different layers to determine how the two different data types of the same depth are handled by the network. In this embodiment, the different types of data are transmitted by the gear mechanism in different layers as network stack.

In another embodiment, a particular data type may be packaged at varying depths to get a sense of how the network handles the particular data type at different depths. For example, video data may be packaged at different depths, 'A', 'B' and 'C' and transmitted in different layers over the network by the transmission module of the gear mechanism. In this embodiment, the different types of data are transmitted by the gear mechanism in different layers as network stack. The network transmission characteristics received periodically as a result of the analysis of the data packets of the particular data type at different depths may provide useful information to determine the appropriate depth for the particular data type that provides optimal results. Specifically, the transmission metrics defined by the network transmission characteristics may be used to calibrate the data packets for the data type to provide optimal transmission result. As can be seen from the different embodiments, different types of data can be packaged in different ways and the compliance rules provide the different recipes for each data type. In one embodiment, the gear mechanism allows the bundling module to periodically cycle through the different recipes for each data type within the compliance rules to calibrate the depth of the data packets in each layer. In another embodiment, the adjuster module, in collaboration with the bundling module, may calibrate the amount of data packets and the depth of the data packets in each layer based on the transmission metrics so as to generate optimal transmission results at the destination so as to provide maximum user experience.

As packets transmitted from the source [2.1] arrive at the destination [2.2], the destination system [2.2] places a response data packets back on the network to inform the source [2.3] of the successful arrival of the data packets at the destination. The response data packets returned to the source is of the same depth as the original data packets. Thus, for instance, the return response data packets for data type 1 will be of depth 'A', the return response data packet for data type 2 will be of depth 'B', the return response data packet for data type 3 will be of depth 'C', and so on depending on the number of types of data provided in the bundle. Further, the data packets returned from the destination are of the same form as the bundled data packets but are not identical in content. This is due to the fact that the data packets transmitted to the destination include payload data and housekeeping data that describe the payload data while the data packets returned from the destination to the source are stripped of the payload data as the data packets traverse the destination and include only housekeeping data.

The gear mechanism monitors the progress of the data packets over the network. When the return packets are received, they are tallied for completeness. This is done by keeping a count of the data packets leaving the source (i.e. input count) and the data packets returning to the source in the response (i.e. output count). The difference between the input count and the output count is determined. In a fully functional network without any problems, the difference should be zero—meaning that all the data packets are accounted. However, in a network with transmission problems, such as loss or latency, the difference could be greater than zero, indicating a stress or slack in the network. In addition to tracking the input and the output counts, the gear mechanism, in one embodiment, monitors the cadence of the data packets in each layer leaving the source (i.e. input cadence) and returning from the destination (output cadence). In an ideal network without any problems, the input cadence will be equal to the output cadence for each of the data types in each of the layers. However, as in the input and output counts, the input and the output cadence of the data packets of each layer leaving the source and arriving back from the destination may not be the same. The difference between the input and the output cadences at each respective layer are noted as network system acceleration that causes the slack and stress on the respective sides of transmission. For example, as illustrated in FIG. 2, the outgoing data packets of data type 1 have an input cadence A at the source and the corresponding incoming data packets have an output cadence A'. Similarly for the data packets of data type 2, the input cadence is B and the output cadence is B', for data packets of data type 3, the input cadence is C and the output cadence is C', and so on. The returning packets A', B' and C' for the corresponding original transmissions A, B, and C are evaluated to determine the respective deltas in cadences. In one embodiment, the evaluation is done not only at the end points of transmission but at every point in time between the time the data packets leaves the source till the time the corresponding response returns to the source. By evaluating the cadence (A-A'), (B-B') and (C-C') at every point in time, the gear mechanism can deduce existence of any elemental loss in different areas of the network, changes in such loss over the period of time at fine grained levels to deduce existence of standing wave effect propagation patterns in both forward and reverse directions, and any other environmental characteristics that can identify physical system characteristics that are instrumental in causing transmission problems on the network during transmission.

In order to evaluate the data packet differentials using cadence deltas, the gear mechanism, in one embodiment, identifies a fractional linear combination of the layered data packets and tracks the data and deltas as the fractional combination of layered data packets progresses along the network to determine differential data over time. The gear mechanism tracks the input and output cadences, input and output count at different layers and depths of the fractional linear combination of layered data packets at various points of time as the fractional linear combination of data packets progresses over the network. The data and deltas at various times from each layer are evaluated and the information related to such data and deltas are collected over the respective time periods and fed back to the gear mechanism. The gear mechanism analyzes the collected information of data and deltas for each layer as well as across all layers of the fractional linear combination of data packets over time to determine environmental characteristics of the network. In one embodiment, the analysis information is used to generate a statistical model. The statistical model represents a real-time map of the state of the system as a whole at different time periods and provides statistically relevant data faster than it takes for the individual packet's round trip traversal of the system.

For instance, using the statistical model the gear mechanism may determine that small data packets are getting lost more than the big data packets, or vice versa. This means that somewhere in the network, the small data packets are experiencing latency due to loss or delay at a higher order and more consistently than other data packets. The gear mechanism may draw such conclusion by analyzing statistical model to identify patterns in the network transmission characteristics and based on the analysis, the gear mechanism may declare that there is a deterministic pattern associated with the particular layer that transmits data packets at small depths. In such a case, the gear mechanism may adjust the transmission of subsequent data packets in the particular layer based on the network transmission characteristics and such adjustments may be repeated one or more times based on the analyzed information for the transmitted data packets.

The statistical model can also be analyzed to determine and establish the maximum throughput using deterministic loss as an upper bound. As data is sent through the system, the deterministic boundary can be constantly tested by various layers of the gear and updated.

Once the deterministic boundary is established, the gear mechanism may adjust the transmission by decreasing the amount of data sent per second so that maximum throughput can be achieved. For instance, if the network capacity is 3 Megabits/second (Mbps), it is noticed that portions of data packets in a particular layer are bundled at 4 Mbps capacity and transmitted over the network are consistently getting lost. In this case, various tests are run to analyze the statistical model and to identify the network transmission characteristics that define the transmission metrics. In one embodiment, the pattern within the network transmission characteristics is found to be a deterministic pattern. Once the pattern is confirmed to be a deterministic pattern, the gear system iteratively reduces the size of the data packets of the particular layer being transmitted to be at or below the loss threshold established by the deterministic boundary. In another example, the gear mechanism may determine a pattern in the network transmission characteristics, wherein every $5^{th}$ data packet of type 1 in layer 1 is getting lost or every $3^{rd}$ data packet of type 2 in layer 2 is getting lost or delayed, etc. In this case, the gear mechanism may look at the pattern in real time as the data is still progressing through the network and establish that the network pattern is a deterministic pattern. As a result, the gear mechanism may proactively adjust the transmission of the subsequent data packets in substantial real time to include additional data packets for the particular layer so as to compensate adjust the network transmission characteristics defining the transmission metrics for the network. In the above example, the subsequent transmission of additional data packets of a layer will ensure that at least one of the data packets will successfully reach the destination thereby minimizing any transmission loss.

In another example, the analysis statistical model may identify a random pattern in the network transmission characteristic for a particular layer of data packets establishing the pattern to be of stochastic in nature. In this case, the gear mechanism may do one of two things. It can ignore the result and continue sending data packets of the particular layer without adjusting the transmission. Such action of ignoring could be based on particular data types in the particular layer. For instance, ignoring the result can bode well for certain data types, such as videos. In the case of videos, if the network problem results in random loss of some data, the gear system can ignore the loss and continue sending the data packets. Ignoring the lost data packets will not compromise the overall quality of the video at the destination as the subsequent data packets will replace the data packets that were lost or delayed in transmission. Alternately, for other data types, the gear mechanism can try and determine the transmission threshold (i.e. data streaming tolerance threshold or loss threshold) and reconfigure the data packets to comply with the transmission threshold so as to minimize loss in transmission. The data types for which such reconfiguration can work include data types such as text, image, etc., wherein the loss can leave a sizeable hole that can compromise the quality. In this case, the data packets for the particular layer can be adjusted to be at or below the transmission threshold and to relay less on the spiky behaviors on the network or can rebuild the data stream for the particular layer at the levels that the system can tolerate and fill to keep the network employed.

In one embodiment, additional adjustments can be made to accommodate certain characteristics that many network systems exhibit, such as allowing short burst of transmission well above the deterministic boundary established by the network. For example, if the network capacity is 3 Mbps, the network system may allow from time to time bursts of data that have a capacity of 5 Mbps. In order to accommodate these bursts of data, the gear mechanism must first need to determine the actual transmission threshold and to ensure that the allowance of the burst of data does not indicate change in the upper deterministic boundary established by the network. This can be easily accomplished by the gear mechanism by generating a set of dummy data packets at varying depths, combining the dummy data packets with the data packets at appropriate depths and transmitting the combined data packets as a pulse. The gear mechanism can then monitor the reaction on the network for the transmitted pulse with the dummy data packets to determine if the deterministic boundary for transmission has changed over time or whether the threshold of the transmitted pulse is a spike threshold that the network allows in an arbitrary manner. During the monitoring, if it is determined that the pulse stream went through without any problems, then a follow-up data stream that is bigger than the normal data stream provided in the data packets is generated with data packets at different depths placed in different layers and transmitted. The follow-up data stream is generated using dummy data, loss of which does not cause any issues or problems at the destination. If the dummy data packets encounter problems, then the gear mechanism may declare the allowance of burst to be associated with a spike threshold. Once it is determined to be a spike threshold, the gear mechanism can attempt to ignore such bursts. If it not determined to be a spike threshold, the gear mechanism may adjust the deterministic boundary upward if it is determined that there has been an upward movement in the transmission threshold. Alternately, the gear mechanism may provide ways to handle the likelihood of deterministic loss with some proactive techniques, such as smoothing the byte stream, redundant transmission or any other technique that is not discussed herein.

The gear mechanism uses the different network transmission characteristics of different types of layers at different times as the data stream progresses over the network to determine the transmission metrics of each layer that defines behavior of the network for each layer so as to differentiate between a stochastic pattern and a deterministic pattern in each layer. The gear mechanism automatically adjusts subsequent data packets in anyone of the layers of the data stream proactively to reduce the transmission jitters at the destination and to optimize the network usage. The gear mechanism looks at not only the information related to individual packets but also information related to a particular type of packet as compared to other types of packets in order to determine overall network transmission characteristics that identify the transmission metrics of each layer. The data and delta patterns of individual packets as well as of packet differentials encountered by packets of different types in the statistical model are changing due to change in network characteristics over time, and are constantly being updated. By using the updated information from the statistical model during the data transmission, the gear mechanism can sense any changes that are occurring in the network transmission and proactively adjust the transmission of subsequent data packets to accommodate the changes. By acting proactively as the data is still being transmitted, any loss, delay or latency during data transmission can be corrected in a fast and timely fashion so as to to optimize the result at the destination end.

The various statistics obtained during analysis of the different characteristics of the network as it relates to different types of data at different depths, can be used by the gear mechanism to determine choices related to retransmission, formatting, size and/or amount of specific types of data packets. For example, the gear mechanism can use the statistics to make a proactive or reactive transmission choice. In proactive hedging, a follow-up packet can be sent with improved accuracy, well before the packet is reported as "lost" based on the statistics obtained through analysis. In reactive transmission, a choice can be made for a packet that is reported lost, and the system is reporting loss characteristics that lower the odds of the packet getting through, to either send duplicate packets in a pattern that can be identified to increase likelihood of successful transmission or ignore the loss, based on the loss patterns and the data type. The gear mechanism can choose the format of packet to be transmitted, size and/or amount of packets to transmit based upon the data collected in the analytics. As mentioned earlier, based upon the need to transmit, the gear mechanism can employ different choices, such as ignore the result and send regular data packets, smooth out spiky behaviors and send below a loss threshold established for the network, or create a data stream at the levels that the system can tolerate and fill to keep the network employed.

By interacting directly with the data stream, a Heisenburg situation will arise with relation to the position of the data packets on the network and the corresponding network characteristics that will provide some leverage to achieve the desired optimal effect at the destination. At the same time, if the payload being transmitted in the data packets has a level of abstraction and tolerance for imperfection, then "in-flight" data stream analysis can result in an ability to ignore retransmission if such ignorance provides an advantage in reducing the contribution to the congestion and loss on the network. This has been explained earlier with reference to video data, wherein the loss in data transmission is overcome by the subsequent transmission of data packets that refreshes the lost data packets without providing any visible difference in the overall quality of service.

The gear system not only provides effective measurements at the receiving end of the gear but also enables interpretation of the data to identify things such as slack on the source side of the data stream, which can denote conditions, such as congestion. The gear mechanism achieves this by leveraging a differential analysis at multiple depths of the same gear and building assumptions around a normal behaving system. This is combined with actual measurements of packet completion of the round trip to provide a mechanism that not only predicts the likelihood that network transmission problems may occur but also proactively addresses such problems to provide a QoS effect on the overall network at substantial cost and time savings.

The gear mechanism also addresses correlation stimulus/response to certain types or size of network behavior. In one embodiment, the gear mechanism may try to poke the system by sending a certain size or type of data and determine the response to the poke from the network. Based on the response, the gear mechanism can figure out what the tolerance level for the particular type or size of data is without overtly challenging the limit or threatening the overall chain and the gear mechanism can manipulate the subsequent transmission of data stream, in real time, to achieve the right quality of service (QoS) effect.

Figure 6:
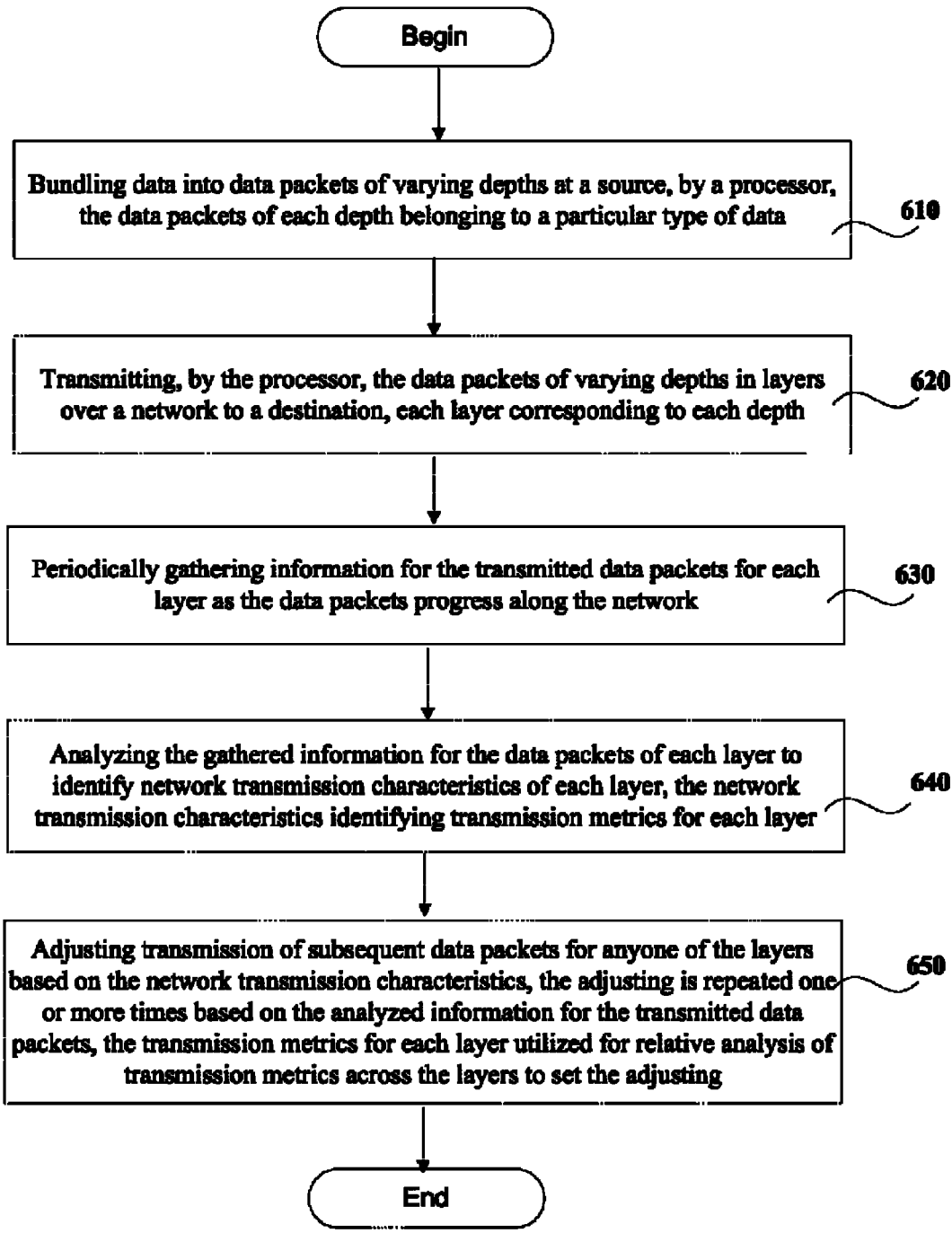
FIG. 6 illustrates a process flow diagram of various steps involved for providing layered gear to analyze network loss and latency conditions, in one embodiment of the invention.

With the above detailed description of the various embodiments, a method will now be described with reference to FIG. 6. Referring now to FIG. 6, the process of providing layered gear mechanism to analyze network loss and latency begins at operation 610, wherein data is bundled into data packets of varying depths at a source. The data can be identified for transmission over the network based on a click or a request received from a destination device, such as mobile device. The identified data can be of different types. The data packets of each depth belong to a particular type of data. A gear mechanism relies on compliance rules established for transmission of different types of data over the network and bundles the data into data packets to comply with these rules. The data packets of varying depths are then transmitted over the network to a destination in layers, as illustrated in operation 620. Each layer of data packets are of a specific depth.

The gear mechanism then periodically collects information related to the data packet transmission over the network for each layer as the data packets progress along the network, as illustrated in operation 630. The information collected by the gear mechanism identify the data and deltas of the data packets at each layer and are collected by tracking cadence and count of each layer's data packets over different times. The collected information is analyzed for each layer of data packets to identify network transmission characteristics of each layer, as illustrated in operation 640. The network transmission characteristics identify transmission metrics for each layer. The analysis not only looks at information related to a particular layer of data packets but at information of particular type of data as it compares with other types of data that are included in the data packets that is being transmitted over the network to determine a mesh of system behavior toward different data types so as to provide a real-time map of the state of the system as a whole. The analysis is used in adjusting subsequent transmission of data packets for anyone of the layers based on the network transmission characteristics. The transmission metrics for each layer are utilized for relative analysis of transmission metrics across the layers in order to set the adjusting of transmission over the network, as illustrated in operation 650. The adjustment to subsequent transmission is performed in an ongoing manner while continuing to collect and analyze information during the data packet transmission over the network.

The various embodiments described herein teach a technique that uses gear mechanism to provide layered analog gears of data and to analyze network loss and latency conditions related to the data packets transmitted over the network. The gear mechanism amplifies the data stream signals to get a sense of what is going on in the network so as to proactively make real time changes to the data packets that are still inside the network so as to optimize the transmission results at the destination. As data packets are being placed on the network, the gear mechanism monitors the data packets on the network to determine if the network is getting saturated. Based on the monitoring, the gear mechanism starts to automatically adjust the subsequent data packet transmission to ensure that the packet transmission does not go over the streaming tolerance that can lead to transmission loss and ultimately to degrade in quality of service at the destination. This proactive approach reduces the time for the transmission of the data packets by at least one-half of the round trip time taken by individual packets to complete the traversal over the network, if not better.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general-purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the invention. Accordingly, the present embodiments are to be considered as illustrative and not restrictive, and the invention is not to be limited to the details given herein, but may be modified within the scope of the invention.

What is claimed is:

1. A processor-implemented method for providing layered gear mechanism to analyze network loss and latency conditions, comprising:
    bundling data into data packets of varying depths at a source, by a processor, the data packets of each depth belonging to a particular type of data;
    transmitting, by the processor, the data packets of varying depths in layers over a network to a destination, each layer corresponding to each depth;
    collecting information for the transmitted data packets for each layer as the data packets progress along the network;
    analyzing the collected information for the data packets of each layer to identify network transmission characteristics of each layer, the network transmission characteristics identifying transmission metrics for each layer; and
    adjusting transmission of subsequent data packets for anyone of the layers based on the network transmission characteristics, the adjusting is repeated one or more times based on the analyzed information for the transmitted data packets, the transmission metrics for each layer utilized for relative analysis of transmission metrics across the layers to set the adjusting.

2. The method of claim 1, wherein the transmitting of the data packets comply with a compliance rule specified for the network, the compliance rule identifying one or more recipes for packaging information for each type of data.

3. The method of claim 1, wherein the data packets include payload data and housekeeping data that comply with transmission protocol of the network, the housekeeping data providing information on the payload data enclosed within the data packet.

4. The method of claim 2, wherein the bundling of data packets at varying depth further includes,
    determining a type of data to be transmitted in each of the layers;
    identifying a pre-defined depth for each type of data in each layer based on the compliance rules; and
    configuring the data in each layer to the corresponding pre-defined depth to generate corresponding data packets.

5. The method of claim 4, wherein bundling further includes,
    cycling through recipes for each data type to calibrate the depth of the data packets in each layer, the calibrated depth used in bundling the data packets for transmission, the cycling through different recipes is performed periodically.

6. The method of claim 1, wherein collecting information further includes,
    determining input count of the data packets in each layer transmitted from the source to the destination over the network;
    determining output count of the data packets in the respective layers returned in a response from the destination to the source; and
    computing difference between the input count and the output count for each layer of the data packets transmitted over the network, the difference used in the analyzing to identify network transmission characteristics of each layer.

7. The method of claim 1, wherein collecting information further includes,
    determining a fractional linear combination of data packets of varying depths represented in the different layers for a specific time;
    determining the input cadence and the output cadence for the data packets in each layer within the fractional linear combination of packets; and
    computing data packet differentials at each layer for the specific time by computing difference between the input cadence and the output cadence of the corresponding data packets in each layer of the fractional linear combination of data packets.

8. The method of claim 7, wherein analyzing further includes, analyzing the data packet differentials at each layer and across the layers within the fractional linear combination of data packets collected for the specific time to determine network transmission characteristics, the network transmission characteristic identifying a stochastic problem or a deterministic problem.

9. The method of claim 7, further includes,
computing data packet differentials at each layer and across the layers of the fractional linear combination of data packets collected periodically; and
generating a statistical model for the data packet differentials for each layer and across the layers, the statistical model providing network transmission characteristics of each layer.

10. The method of claim 9, wherein analyzing further includes,
analyzing the statistical model to identify a pattern in the network transmission characteristics in each layer; and
determining the identified pattern in each layer to be a stochastic pattern or deterministic pattern.

11. The method of claim 10, wherein adjusting transmission of subsequent data packets further includes,
when the identified pattern of a specific layer is a deterministic pattern,
adjusting the subsequent transmission of the data packets at the specific layer iteratively to adjust the network transmission characteristics at the specific layer.

12. The method of claim 10, wherein adjusting transmission of subsequent data packets further includes,
when the identified pattern of a specific layer is a stochastic pattern,
adjusting subsequent transmission of the data packets at the specific depth by including additional data packets at the depth for the particular type of data in the specific layer, the additional data packets used in adjusting the network transmission characteristics for the specific layer.

13. The method of claim 10, wherein adjusting transmission of subsequent data packets further includes,
when the identified pattern of a specific layer is a stochastic problem,
determining type of data at the specific layer; and
continuing transmission of the subsequent data packets without adjusting the transmission for the specific layer, the continuing transmission adjusting the network transmission characteristics for the specific layer.

14. The method of claim 1, transmitting data packets further includes,
generating a set of dummy data packets of varying depths, the dummy data packets having dummy payload data, the dummy data packets of each depth belong to particular type of data;
transmitting the dummy data packets of varying depths in layers with the data packets as a pulse; and
monitoring reaction on the network for the transmitted pulse of dummy data packets, the monitored reaction providing information for the data packets in each layer to identify network transmission characteristics of each layer, the network transmission characteristics identifying streaming tolerance of the network.

15. The method of claim 14, wherein the generation and transmission of the dummy data packets and monitoring reaction are performed periodically to determine if the streaming tolerance of the network transmission characteristics of the network fluctuates over time.

16. A non-transitory computer readable medium having program instructions embedded therein, which when executed by a server of a computing system provides layered gear mechanism to analyze network loss and latency conditions, the program instructions comprising:
program instructions for bundling data into data packets of varying depths at a source, by a processor, the data packets of each depth belonging to a particular type of data;
program instructions for transmitting, by the processor, the data packets of varying depths in layers over a network to a destination, each layer corresponding to each depth;
program instructions for collecting information for the transmitted data packets for each layer as the data packets progress along the network;
program instructions for analyzing the collected information for the data packets of each layer to identify network transmission characteristics of each layer, the network transmission characteristics identifying transmission metrics for each layer; and
program instructions for adjusting transmission of subsequent data packets for anyone of the layers based on the network transmission characteristics, the adjusting is repeated one or more times based on the analyzed information for the transmitted data packets, the transmission metrics for each layer utilized for relative analysis of transmission metrics across the layers to set the adjusting.

17. The computer readable medium of claim 16, wherein program instructions for collecting information further includes,
program instructions for determining a fractional linear combination of data packets of varying depths represented in the different layers for a specific time;
program instructions for determining the input cadence and the output cadence for the data packets in each layer within the fractional linear combination of packets; and
program instructions for computing data packet differentials at each layer for the specific time by computing difference between the input cadence and the output cadence of the corresponding data packets in each layer of the fractional linear combination of data packets.

18. The computer readable medium of claim 17, wherein program instructions for analyzing further includes,
program instructions for analyzing the data packet differentials at each layer and across the layers within the fractional linear combination of data packets collected for the specific time to determine network transmission characteristics, the network transmission characteristic identifying a stochastic characteristic or a deterministic characteristic.

19. The computer readable medium of claim 17, further includes,
program instructions for computing data packet differentials at each layer and across the layers of the fractional linear combination of data packets collected;
program instructions for generating a statistical model for the data packet differentials for each layer and across the layers, the statistical model providing network transmission characteristics of each layer;
program instructions for analyzing the statistical model to identify a pattern in the network transmission characteristics in each layer; and
program instructions for determining the identified pattern in each layer to be a stochastic pattern or deterministic pattern.

20. The computer readable medium of claim 19, wherein program instructions for adjusting transmission of subsequent data packets further includes,
    when the identified pattern of a specific layer is a deterministic pattern,
        program instructions for adjusting the subsequent transmission of the data packets at the specific layer iteratively to adjust the network transmission characteristics at the specific layer.

21. The computer readable medium of claim 19, wherein program instructions for adjusting transmission of subsequent data packets further includes,
    when the identified pattern of a specific layer is a stochastic pattern,
        program instructions for adjusting subsequent transmission of the data packets at the specific depth by including additional data packets at the depth for the particular type of data in the specific layer, the additional data packets used in adjusting the network transmission characteristics for the specific layer.

22. The computer readable medium of claim 16, wherein program instructions for transmitting data further includes,
    program instructions for generating a set of dummy data packets of varying depths, the dummy data packets having dummy payload data, the dummy data packets of each depth belong to particular type of data;
    program instructions for transmitting the dummy data packets of varying depths in layers with the data packets as a pulse; and
    program instructions for monitoring reaction on the network for the transmitted pulse of dummy data packets, the monitored reaction providing information for the data packets in each layer to identify network transmission characteristics of each layer, the network transmission characteristics identifying streaming tolerance of the network.

23. The computer readable medium of claim 22, wherein the generation and transmission of the dummy data packets and monitoring reaction are performed periodically to determine if the streaming tolerance of the network transmission characteristics of the network fluctuates over time.

24. A processor-implemented method for providing layered gearing mechanism to analyze network loss and latency conditions, comprising:
    bundling data into data packets of varying depths at a source, by a processor, the data packets of each depth belonging to a particular type of data, the data packets include payload data and housekeeping data;
    transmitting, by the processor, the data packets of varying depths in layers over a network to a destination, each layer corresponding to each depth;
    receiving response data packets for each layer of the transmitted data packets from the destination, the response data packets including housekeeping data;
    collecting information for the transmitted data packets for each layer as the data packets progress along the network;
    analyzing the response data packets received from the destination and the collected information for the data packets of each layer to identify network transmission characteristics of each layer, the network transmission characteristics identifying transmission metrics for each layer; and
    adjusting transmission of subsequent data packets for any one of the layers based on the network transmission characteristics, the adjusting is repeated one or more times based on the analyzed information for the transmitted data packets, the transmission metrics for each layer utilized for relative analysis of transmission metrics across the layers to set the adjusting.

25. The method of claim 24, wherein the network transmission characteristics include any one or combination from a group consisting of streaming tolerance for various types of data, standing wave propagation patterns, loss characteristics of consistency, lost characteristics of spike tolerance, loss and latency characteristics of oscillation patterns, statistical likelihood of various size loss holes, ebb and flow patterns of loss/latency.

* * * * *